United States Patent Office 3,510,213
Patented May 5, 1970

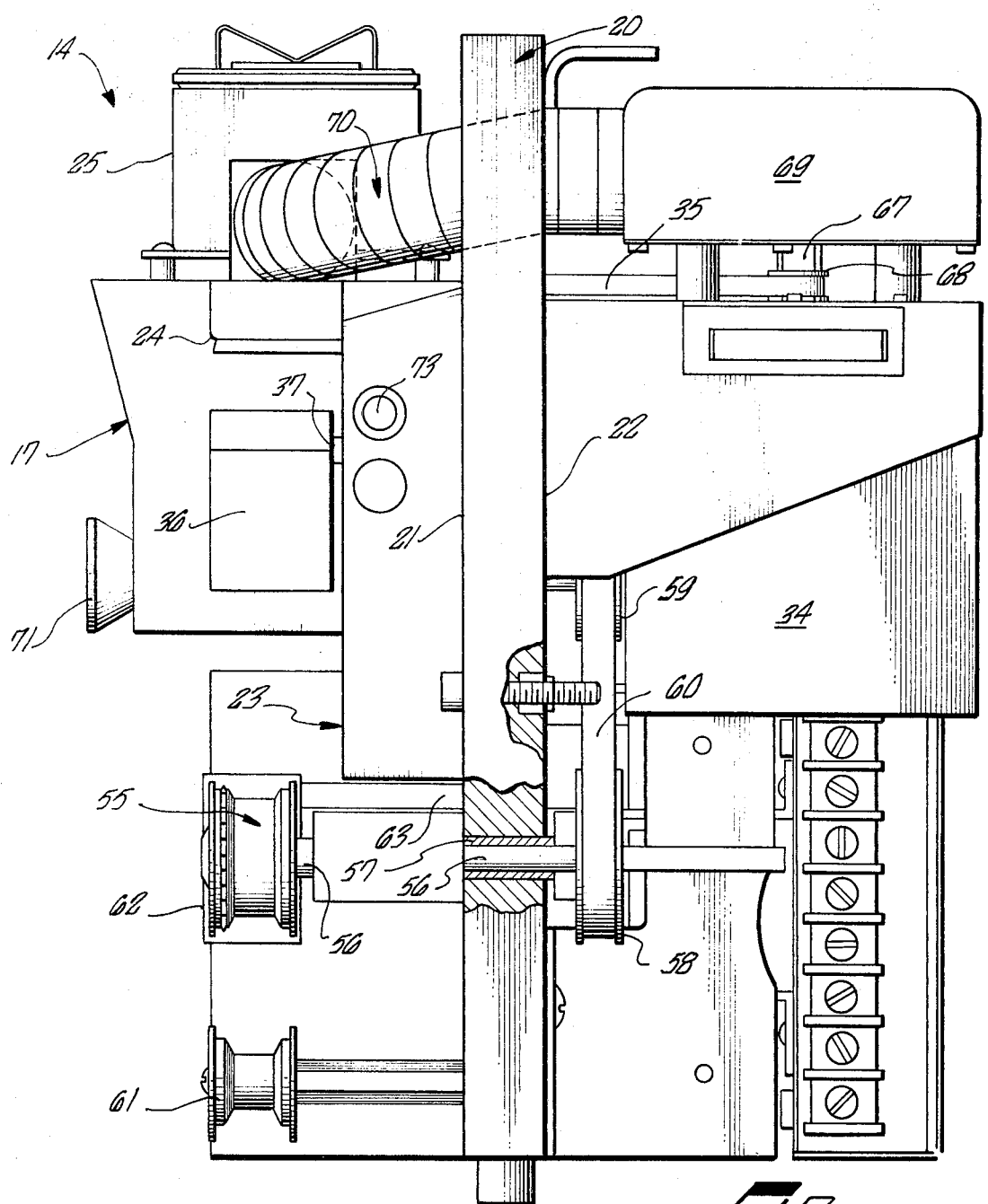

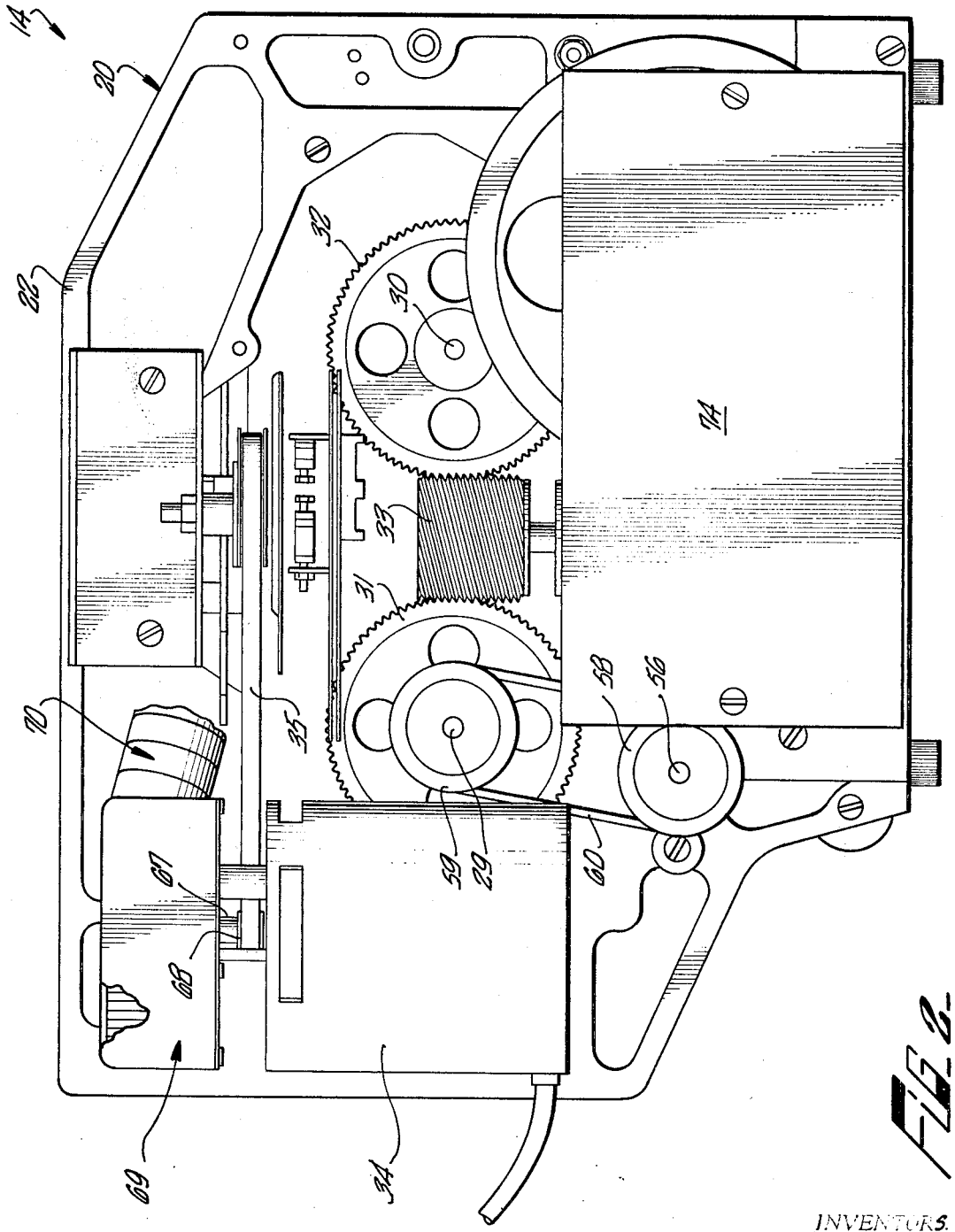

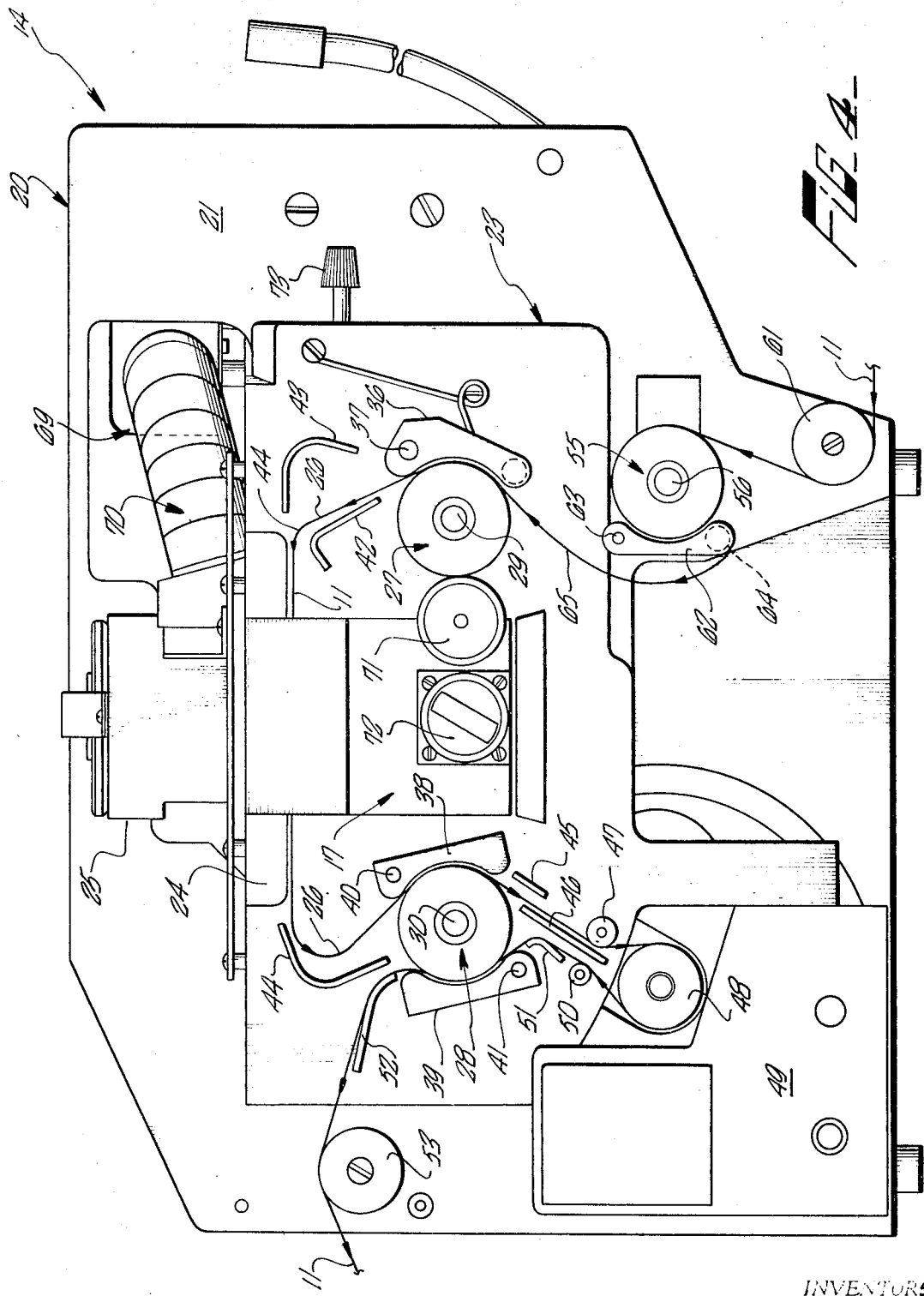

3,510,213
MOTION PICTURE PROJECTOR
Patrick J. Cunningham, Fullerton, and Holland H. Freeman, Sierra Madre, Calif., assignors, by mesne assignments, to Bell & Howell Company, Chicago, Ill., a corporation of Illinois
Filed Feb. 27, 1967, Ser. No. 618,649
Int. Cl. G03b 1/24
U.S. Cl. 352—166                2 Claims

ABSTRACT OF THE DISCLOSURE

Motion picture film advancing apparatus for successively advancing a motion picture film past a plurality of projection stations positioned along the film path. Each projection station has a film drive sprocket positioned upstream of the projection axis for feeding film into a shuttle loop. A second sprocket is provided upstream of the drive sprocket for feeding film to the drive sprocket at the same rate that the drive sprocket feeds film to the shuttle loop. The shafts of the two sprockets are connected with each other by means of a belt extending between identical pulleys on the two shafts.

BACKGROUND OF THE INVENTION

Field of the invention

This invention relates to motion picture projectors, and particularly to an improved film handling structure for such projectors. The structure markedly reduces, if not altogether eliminates, jumping and jamming of the film in its transit through the projector from a film supply station to a film take-up station.

The problem

Jumping or jamming of motion picture film has long been a problem in motion picture projectors. Not only does film jumping produce a disconcerting effect upon viewers of the projected image, but such action of the film, if not promptly corrected, can and does result in stripping of the film sprocket holes and even breakage of the film. If the film breaks, it is likely that the projector will become jammed with film. In existing projectors, established jumping action of the film can be corrected only by rethreading the projector or by momentarily operating a device which disables the mechanism which advances the film on a frame-by-frame basis past the optical axis which exists between the projection lamp and the projection lens assembly in the projector.

The frame-by-frame film advance mechanism conventionally includes input and take-out film drive sprockets located on opposite sides of the projector optical axis at the forward and rear ends of a shuttle loop formed in the film. The shuttle loop traverses the projector optical axis. The input and take-out sprockets rotate at equal and constant rates; and between the sprockets the film within the shuttle loop is engaged by a reciprocating shuttle member for moving the film past the optical axis on the desired frame-by-frame basis. The shuttle member carries teeth which engage the sprocket holes formed in a margin of the film. The film in the shuttle loop on opposite sides of the shuttle member between the drive sprockets is unconfined when the film advance mechanism is operating properly. If the film is placed under any appreciable tension between the input drive sprocket and the shuttle member, the likelihood is that the shuttle member will improperly engage the film. When this occurs, the film sprocket holes may be stripped, the film may jump or it may even break.

SUMMARY OF THE INVENTION

It has been found that the principal cause of film jumping in motion picture projectors of the type here under consideration is directly related to malfunctioning of the shuttle loop input drive sprocket. If the film fed to the input drive sprocket is subject to too much tension, this sprocket will tend to lose one or more inter-sprocket hole intervals relative to the film, and the amount of film present in the shuttle loop between the sprocket and the shuttle member will be reduced. Any such reduction in this portion of the film path increases the tension in the film at the shuttle member, and correspondingly increases the likelihood that the film will jump at the optical axis, as described above.

This invention produces a simple, effective, economic and efficient apparatus for overcoming the problem of film jump in motion picture projectors by supplying film to the shuttle loop input drive sprocket in such a manner that the film is subjected to little or no tension. The invention permits small, relatively inexpensive projection to be used in relatively inaccessible locations. The invention has particular, and presently preferred utility in each of the several projectors provided in the film display system described in copending, commonly owned application Ser. No. 485,768, filed Sept. 8, 1965, now U.S. Pat. 3,379,488.

In broad terms, the invention resides in a motion picture projector which includes a film advance mechanism for moving a strip of motion picture film on a frame-by-frame basis from a supply station to a take-up station past an optical axis in the projector. The film advance mechanism includes means for defining a shuttle loop in the film traversing the optical axis, such means including a shuttle loop input film drive sprocket disposed along the film path on the side of the optical axis toward the film supply station. The improvement provided by this invention includes a film advance sprocket disposed essentially next-adjacent the input drive sprocket along the film path on the side of the input drive sprocket toward the film supply station. The advance sprocket is provided for advancing film to the drive sprocket at the same rate as the rate at which the drive sprocket is effective to advance film to the shuttle loop. The drive and advance sprockets are arranged so that film passing therebetween is essentially free of tension.

DESCRIPTION OF THE DRAWINGS

The above-mentioned and other features of the invention are more fully set forth in the following detailed description of a presently preferred embodiment of the invention, which description is presented with reference to the accompanying drawings wherein:

FIG. 1 is a schematic view of a film display system in which the invention presently finds its preferred use;

FIG. 2 is a back elevation view of a projector according to this invention;

FIG. 3 is a side elevation view, with parts broken away, of the projector shown in FIG. 2; and FIG. 4 is a front elevation view of the projector shown in FIG. 2.

DESCRIPTION OF THE PRESENTLY PREFERRED EMBODIMENT

As noted above, the presently preferred use of this invention is in a film display system in accord with copending, commonly owned application Ser. No. 485,768, filed Sept. 8, 1965, now U.S. Pat. 3,379,488, a portion of such a system 10 being shown in simplified form in FIG. 1. The system includes a film supply station (not shown) and a film take-up station (not shown) between which a single length of film 11 is passed. At several locations spaced serially along the path of the film are located separate projection stations 12, the stations being interconnected with each other and with the supply and take-up stations by film guide ducting 13 through which the film passes. Each projection station includes a projector 14 (see FIGS. 2–4) having an optical axis 15 along which are located a projection lamp 16 and a projection lens assembly 17 (see FIG. 4) between which the film passes. After passing through the film and to and through the projection lens assembly, the light from the projection lamp is directed to a mirror 18 and thence to a frosted or ground glass back-lit viewing screen 19. Preferably each projection station is located in the overhead baggage rack conventionally provided in the passenger compartment of a commercial passenger aircraft; the mirror and viewing screen for each projection station are arranged to be retracted into the baggage rack when the system is not in use.

As shown in FIGS. 2, 3 and 4, a projector 14 includes a foundation plate 20 having a front side 21 and a back side 22. A housing 23 for a film advance mechanism, a projection lamp, a lens assembly and an audio pick-up unit is mounted to the front side of the foundation plate. Preferably the housing and the mechanisms in and on it are essentially standard components of a Bell & Howell Series 500 16 mm. motion picture projector, and particularly of a Model 552 Bell & Howell projector, although the corresponding components of any suitable projector can be used.

The projection lens assembly 17 is mounted adjacent a shuttle and shutter enclosing boss 24, a housing 25 for a projection lamp being mounted in line with the projection lens assembly on the opposite side of the boss. The boss lies adjacent the central portion of a shuttle loop 26 which is provided in the path of film 11 during operation of the projector. The shuttle loop is located in the film path between a shuttle loop input drive sprocket 27 and a shuttle loop take-out drive sprocket 28. Sprockets 27 and 28 are mounted on shafts 29 and 30, respectively, which extend through housing 23 and the foundation plate to be connected to respective worm wheels 31 and 32 mounted adjacent the back side of the foundation plate. The worm wheels are engaged with opposite sides of a common worm 33 located between the worm wheels. The worm is rotated in response to operation of a drive motor 34 which is coupled to the worm via a drive belt 35 and through suitable gear trains in housing 23. As a result, sprockets 27 and 28 rotate at constant equal rates to advance film into the shuttle loop and to withdraw film from the shuttle loop at constant equal rates.

As shown in FIG. 4, input drive sprocket 27 is provided with a retractible film guard shoe 36 pivotally mounted to housing 23 on a pin 37. The take-out drive sprocket has associated with it two retractible film guard shoes 38 and 39 pivotally mounted to the housing on pins 40 and 41, respectively.

The film path from the shuttle loop input sprocket is between a pair of shuttle loop guides 42 and 43 located on opposite sides of the film path between sprocket 27 and the lens assembly, as shown in FIG. 4. When the projector is functioning normally, the film adjacent guides 42 and 43 is essentially free of axial tension and does not engage the guides; instead it forms a bend 44 between the guides as a result of the length of film present in this upstream half of the shuttle loop. It is important to proper operation of the projector that the film not engage guide 42 because the film is stepped past the lens assembly by the mechanism in boss 24, whereas the film is continuously introduced into the shuttle loop by sprocket 27. If the film should be brought into engagement with guide 42, the necessary cooperation of the film with the film stepping mechanism will be impaired and the familiar problem of film jump will be present. Such engagement of the film with guide 42 results when the film slips relative to sprocket 27 so that the rate of withdrawal of film from the shuttle loop exceeds the rate at which film is introduced to the shuttle loop. Such slippage of the film relative to sprocket 27 results when the sprocket must work too hard to draw film to it, i.e., when the axial tension in the film immediately upstream of sprocket 27 is too great.

Before describing the structure provided by the present invention, the description of the other structure of the projector illustrated in the drawings will be completed so that the significance of the present invention will be more apparent. As shown in FIG. 4, as the film moves from the projection lens assembly toward sprocket 28, it passes a film guide 44. After passing between sprocket 28 and guard 38, the film passes between guide plates 45 and 46, past a roller 47, and into contact with an idler roller 48 in an audio pick-up unit 49 which cooperates with a sound track optically recorded in film 11. The film passes around roller 48, past a roller 50, and between guide plate 46 and an additional guide plate 51 to pass between guard 39 and sprocket 28. After leaving the take-out sprocket for the second time, the film passes a guide 52 and is fed to an idler roller 53 mounted to foundation plate 21. In the conventional projector, the film passes from guide 52 to a film take-up reel mounted to the projector.

The structure provided by this invention includes a film advance sprocket 55 mounted on a rotatable shaft 56 carried by foundation plate 21 (see FIGS. 3 and 4). Sprocket 55 is located essentially next-adjacent sprocket 27 along the film path on the side of sprocket 27 opposite from shuttle loop 26. Preferably sprocket 55 is identical to sprockets 27 and 28. As shown in FIG. 3, shaft 56 extends through a suitable bearing 57 carried by the foundation plate to a pulley 58 secured to the shaft adjacent the back side of the foundation plate. Worm wheel 31 (FIG. 2), associated with sprocket 27 via shaft 29, is provided with a coaxial pulley 59 having the same diameter as pulley 58. A timing belt 60 is engaged between the pulleys with the result that sprockets 27 and 55 rotate continuously in the same direction at the same rate and are locked into synchronism with each other.

An idler roller 61 is rotatably mounted to the foundation plate and is disposed in the film path upstream of advance sprocket 55 as shown in FIG. 4. Sprocket 55 is provided with a retractible guard shoe 62 which is pivotally mounted on a pin 63 secured to the foundation plate and which carries a roller 64 at its end opposite from pin 63. Idler roller 61 and guard 62 are arranged relative to the advance sprocket so that film 11 engages the sprocket around at least about 180°, and preferably about 240°, of the 360° peripheral arc of the sprocket. Thus, a substantial number of the teeth of sprocket 55 are always registered in the sprocket apertures formed through a margin of film 11.

As film emerges from between the advance sprocket and its guard shoe, it passes around roller 64 and into a loop 65 defined in the film path between sprockets 55 and 27. In the loop, the film is essentially free of axial tension. Thus, the film supplied to the shuttle loop input sprocket 27 is essentially entirely devoid of axial tension and the cause of any slippage of the film relative to sprocket 27 is eliminated. As a result, sprocket 27 functions properly to feed film into the shuttle loop and the shuttle loop is maintained as desired with the film clear of guide 42. Thus, the film is maintained in a condition to properly engage the mechanism which steps the film past the projection lens assembly across the projector optical axis on a frame-by-frame basis, and the film cannot jump at the optical axis.

The film advance sprocket described above can obviously be used to advantage in a conventional motion picture to meter tension-free film from the film supply reel to the shuttle loop input sprocket. The advance sprocket is especially useful in film display system 10 wherein each projection station 12 is relatively inaccessible since each projector is located within a protective housing 66 and wherein the distance from the film supply station to the first projection station and from projection station to projection station may be relatively great. The considerable wrap of film 11 around each advance sprocket results in these sprockets having great film pulling power sufficient to assure that the film is moved as desired between the several projection stations in the system. The advance sprocket at each projection station also assures that film is drawn to that station at the proper rate and that the shuttle loop input sprocket at that station is not overloaded. The provision of an advance sprocket as described above at each of the several projection stations in system 10 has been found to result in a system which is essentially entirely free of the problem of film jump. This is a particularly noteworthy aspect of system 10 in view of the system being located, in the preferred instance, in the passenger cabin of a moving commercial aircraft.

In fact, advance sprocket 55 has proved to be so effective that when three or four consecutive sprocket holes are removed from film 11, the film still passes properly through the projector; such mutilated film has been passed many times through four successive projectors without any malfunction of any of the projectors. If five consecutive sprocket holes are removed from the film, the film still passes through the serial projectors with only infrequent malfunctioning of the projector film advance mechanisms.

As shown in FIGS. 2, 3 and 4, projector drive motor 34 has an output shaft 67 which is connected to a drive pulley 68 for belt 35 and to a squirrel cage air blower 69, the output of which is applied to projection lamp housing 25 via a duct 70 for cooling the projection lamp and the film moving past the lamp. The projection lens assembly is provided with a focus adjustment knob 71 and a focus lock knob 72. The film advance mechanism within boss 24 of housing 23 is provided with a framing control knob 73 operable for adjusting the framing of film moving past the lens assembly relative to the optical axis of the projector. An amplifier 74 for the output of audio pickup unit 49 is mounted adjacent the back side of the foundation plate as shown in FIG. 2.

With respect to the following claims, the invention is defined in the context of a motion picture projector which includes a film advance mechanism for moving a strip of motion picture film on a frame-by-frame basis from a film supply station to a film take-up station past an optical axis in the projector. When the invention is used in a projector in which the film passes a projection lamp only once in its transit from the supply station to the take-up station, the supply and take-up stations are the film supply and take-up reels, respectively. However, when the projector is located at one of the projection stations in system 10, for example, the supply station can be either the supply reel (the projector being the first projector to which the film is fed) or the projection station upstream of the one station; similarly, the take-up station would be either the take-up reel or the next projector downstream of the one projection station.

What is claimed is:

1. In a motion picture projector including a film advance mechanism for moving a strip of motion picture film on a frame-by-frame basis from a film supply station to a film take-up station past an optical axis in the projector, the film advance mechanism including means for defining a shuttle loop in the film traversing the optical axis, said defining means including a film drive sprocket disposed along the film path essentially next-adjacent the optical axis on the side thereof toward the film supply station, wherein the improvement comprises a film advance sprocket essentially identical to the film drive sprocket disposed essentially next-adjacent the film drive sprocket on the side thereof toward the supply station for advancing film to the film drive sprocket at the same rate as the rate at which the drive sprocket is effective to advance film to the shuttle loop, and means for rotating the advance sprocket at the same rate as the drive sprocket including a first rotatable shaft in the film advance mechanism to which the film drive sprocket is mounted and means for rotating the first shaft at a selected rate, a second rotatable shaft to which the advance sprocket is mounted, substantially identical pulleys mounted to the first and second shafts, and a belt engaged between the pulleys.

2. Apparatus according to claim 1 wherein the supply station includes another projector spaced from the first-mentioned projector.

References Cited

UNITED STATES PATENTS

| | | |
|---|---|---|
| 1,309,471 | 7/1919 | Evans. |
| 2,028,485 | 1/1936 | Wright _____ 352—166 X |
| 3,025,751 | 3/1962 | Braun _____ 352—14 |
| 3,379,488 | 4/1968 | Lancor _____ 352—14 X |

NORTON ANSHER, Primary Examiner

M. H. HAYES, Assistant Examiner

U.S. Cl. X.R.

352—159